United States Patent [19]

Morikawa et al.

[11] Patent Number: 5,056,077
[45] Date of Patent: Oct. 8, 1991

[54] CENTERING MECHANISM FOR AUTOMOTIVE DISC PLAYER

[75] Inventors: Kiyoshi Morikawa; Masakazu Kurumada; Kazuo Kobayashi; Yoshinori Yamada; Masanori Sugihara, all of Saitama, Japan

[73] Assignee: Pioneer Electronic Corporation, Tokyo, Japan

[21] Appl. No.: 487,508

[22] Filed: Mar. 2, 1990

[30] Foreign Application Priority Data

Mar. 3, 1989 [JP] Japan .................................. 1-52603

[51] Int. Cl.⁵ .................... G11B 33/02; G11B 5/016; G11B 17/04
[52] U.S. Cl. .................................. 369/77.1; 369/75.1; 369/75.2; 360/99.02; 360/99.06
[58] Field of Search ................... 369/77.1, 77.2, 75.1, 369/75.2, 194; 360/99.02, 99.06

[56] References Cited

U.S. PATENT DOCUMENTS

| | | | |
|---|---|---|---|
| 2,508,715 | 5/1950 | Harman | 369/77.1 |
| 4,302,832 | 11/1981 | Cheeseboro | 369/77.1 |
| 4,498,162 | 2/1985 | Schatteman | 369/194 X |
| 4,523,306 | 6/1985 | Staar | 369/77.1 |
| 4,700,338 | 10/1987 | Sugihara et al. | 369/77.1 |
| 4,701,902 | 10/1987 | Aoyagi et al. | 369/77.1 |
| 4,734,813 | 3/1988 | Bessho | 360/99.06 X |
| 4,829,502 | 5/1989 | Aoyagi et al. | 369/77.1 |
| 4,839,880 | 6/1989 | d'Alayer de Costenore | 369/75.2 |

FOREIGN PATENT DOCUMENTS

| | | |
|---|---|---|
| 3314400 | 11/1983 | Fed. Rep. of Germany . |
| 3402491 | 8/1984 | Fed. Rep. of Germany . |
| 3443070 | 8/1985 | Fed. Rep. of Germany . |
| 3515437 | 11/1986 | Fed. Rep. of Germany . |
| 3820801 | 2/1989 | Fed. Rep. of Germany . |

Primary Examiner—David Trafton
Assistant Examiner—Tien B. Pham
Attorney, Agent, or Firm—Sughrue, Mion, Zinn, Macpeak & Seas

[57] ABSTRACT

A disc player is disclosed which comprises a casing having a disc inserting opening, a turntable driven by a spindle motor, a clamper arm operating mechanism for operating a clamper arm in cooperation with said turntable, a centering mechanism for guiding a disc from the disc inserting opening onto the turntable, the centering mechanism including a pair of centering arms each having at distal end portions contact portions which are to be brought into contact with a circumferential edge of the disc, the centering arms being pivotally movable at a predetermined distance in the disc inserting opening, a detecting pin for detecting a condition that the disc is laid on the turntable; a separating mechanism for separating the pair of centering arms away from the circumferential edge of the disc when the disc is loaded on said turntable in cooperation with the clamper arm operating means. The mechanism is in cooperation with the centering mechanism whereby the disc is located outside of a vibration range of the disc.

4 Claims, 7 Drawing Sheets

CENTERING MECHANISM FOR AUTOMOTIVE DISC PLAYER

BACKGROUND OF THE INVENTION

This invention relates to a disc player having a centering mechanism which, in inserting a disc into the disc inserting opening thereof, operates to position the disc at the center of the disc inserting opening.

Figure 1:
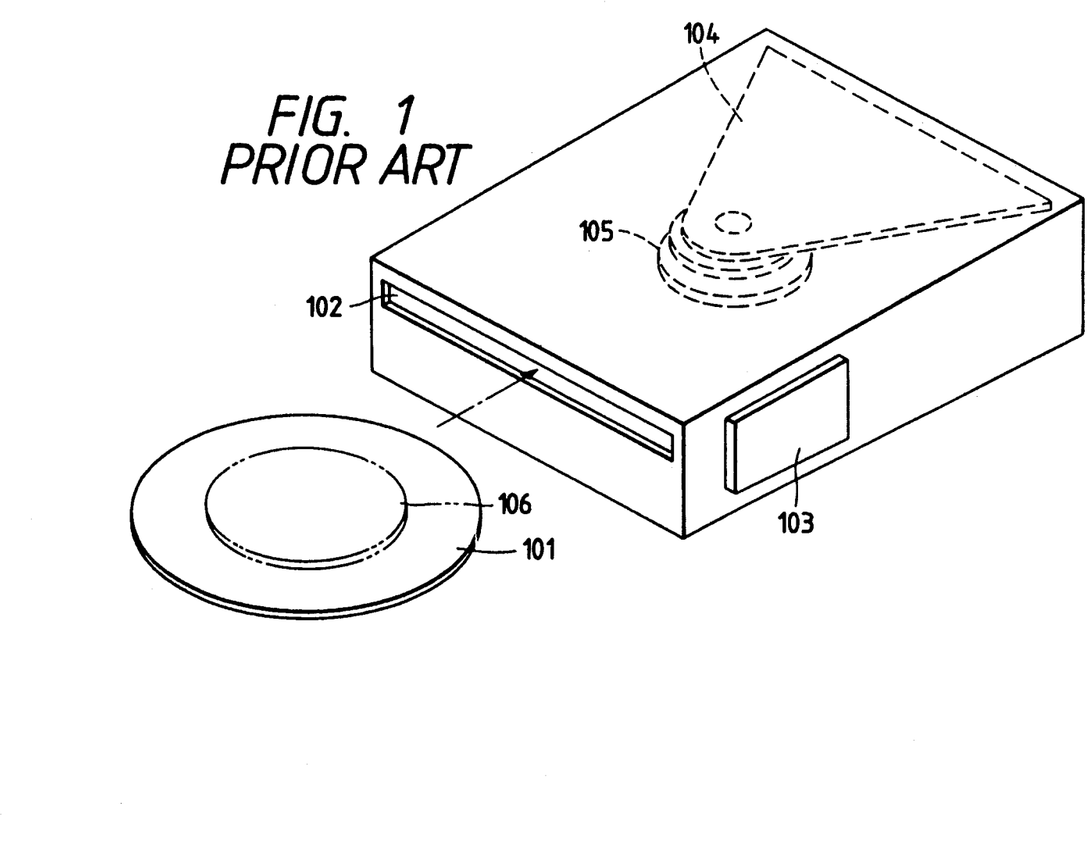
FIG. 1 is a perspective view of a conventional vehicle CD player.

Recently, a compact disc has been developed which has a recording layer having pits corresponding to digital signals obtained by converting analog sounds (hereinafter referred merely as "a disc", when applicable). With the disc, analog sounds are optically reproduced by using a laser beam applied by the reading head of a CD (compact disc) player. The disc is much superior both in tone quality and in operability to conventional LP record discs. Hence, the compact disc together with its CD player has quickly come into wide use. Accordingly, CD players to be mounted on vehicles have been developed (hereinafter referred to as "vehicle disc players", when applicable). One example of the vehicle disc players is as shown in FIG. 1. In FIG. 1, reference numeral 101 designates a disc of 12 cm in diameter in which pieces of music have been recorded. When the disc 101 is inserted into a disc inserting opening 102, it is conveyed to a predetermined position (which is substantially the center of the CD player) by a loading mechanism 103, where it is fixedly mounted on the turntable 105 by a clamper arm 104. The disc 101 thus mounted is rotated by a spindle motor (not shown), so that the pieces of music are reproduced with a reading head (not shown). In the vehicle CD player, the clamper arm 104, the turntable, and the reading head are supported in floating manner so that they are substantially free from vibration during traveling.

On the other hand, a disc 106 of 8 cm in diameter, which is much smaller in diameter than the disc 101 of 12 cm in diameter, has been proposed in the art.

The above-described conventional vehicle CD player suffers from the following difficulties: It is rather difficult to insert a disc into the disc inserting opening 102 at the middle, and therefore it is necessary to use the centering mechanism. Particularly it is difficult to insert the 8 cm disc into the disc inserting opening 102 at the middle, because the disc inserting opening 102 is large. If, in inserting the disc into the opening 102, it is shifted from the middle of the opening 102, then it is impossible to set the disc at the predetermined position on the turntable. In particular, in an automotive CD player, since the player is vibrated during a travel of the vehicle, it is more difficult to insert a small disc into the disc inserting opening.

This difficulty may be eliminated by provision of the centering mechanism which move the disc to the middle of the disc inserting opening if it is shifted therefrom. That is, the centering mechanism has a centering pin which, when a disc is inserted into the disc inserting opening, limits the shifting of the disc from the middle of the opening. The centering pin, located near the disc inserting opening, may result in the following difficulty: In the case where a 12 cm large disc 101 is mounted on the turntable 105, the centering pin and the disc 101 ma collide with each other by vibration of the vehicle traveling, since the turntable is floatingly supported to the base.

SUMMARY OF THE INVENTION

In view of the foregoing, an object of this invention is to provide a disc player in which, even if the disc player is greatly vibrated during the traveling of the vehicle, each of the small and large diameter discs can be readily inserted into the disc inserting opening at the middle, and even when a large disc 101 of 12 cm in diameter is inserted, the disc and the centering pin will not collide with each other.

A vehicle disc player is, in general, on the front panel or the like of the vehicle. Therefore, the vehicle disc player is vibrated during traveling of the vehicle. Therefore, it is rather troublesome for the operator to insert a smaller diameter disc into the disc inserting opening at the middle; that is, he cannot position the disc at the middle of the disc inserting opening without turning his attention to it. However, since the centering mechanism is provided near the disc inserting opening, the disc can be readily positioned at the middle of the disc inserting opening with the aid of the centering pins of the centering mechanism.

The supporting frame supporting the player body is supported by the stationary frame in a shock absorbing mode; that is, it is supported in floating manner. Therefore, the disc mounted on the turntable may collide the centering pins of the centering mechanism. Especially with a large diameter (12-cm) disc, this probability of collision is high. When the disc is inserted into a predetermined position, the disc causes the clamper arm to be lowered through the link mechanism, to thereby release the lock of the support frame. Then, the support frame is floatingly supported. The link mechanism causes the centering lever to slidingly move through its operating arm, to thereby rotate the two centering arms. Thus, the respective contact portions of the centering arms are located out of the vibration range in the back and forth and right and left directions of the disc floatingly supported. Accordingly, even if the contact portions of the centering arms are designed within the vibration range of the disc, when the disc is clamped on the turntable, the contact portions are located outside the vibration range. This makes it possible to design the player.

According to the present invention, there is provided a disc player comprising: a casing having a disc inserting opening; a turntable driven by a spindle motor; a clamper arm operating means for operating the clamper arm in cooperation with the turntable; a centering means for guiding a disc from the disc inserting opening onto said turntable, the centering means including a pair of centering arms each having at distal end portions contact portions which are to be brought into contact with a circumferential edge of the disc, the centering arms being pivotally movable at a predetermined distance in the disc inserting opening; detecting means for detecting a condition that the disc is laid on at a predetermined position within said casing; and means for separating said pair of centering arms away from the circumferential edge of the disc when the disc is loaded on said turntable in cooperation with the clamper arm operating means, the separating means being in cooperation with said centering mechanism whereby the disc is located outside of a vibration range of the disc.

According to the invention, the disc player further comprises a centering lever means for allowing the pair of centering arms to be pivotally opened when the circumferential edge of the disc is simultaneously brought into contact with said contact portions of the centering arms and for locking the pair of centering arms when the circumferential edge of the disc is brought into contact with only one of the contact portions of said centering arms.

The separating means includes a linkage means having a first link and a second link, said first link is pivotally coupled to said detecting means and the second link having a push portion for engaging with the centering lever means. The centering lever means includes an abutment that is engaged with the push portion of said second link of the linkage means.

DESCRIPTION OF THE PREFERRED EMBODIMENTS

One embodiment of this invention will be described with & reference to the accompanying drawings. FIGS. 2 through 11 show one example of a vehicle CD player according to the invention.

Figure 2:
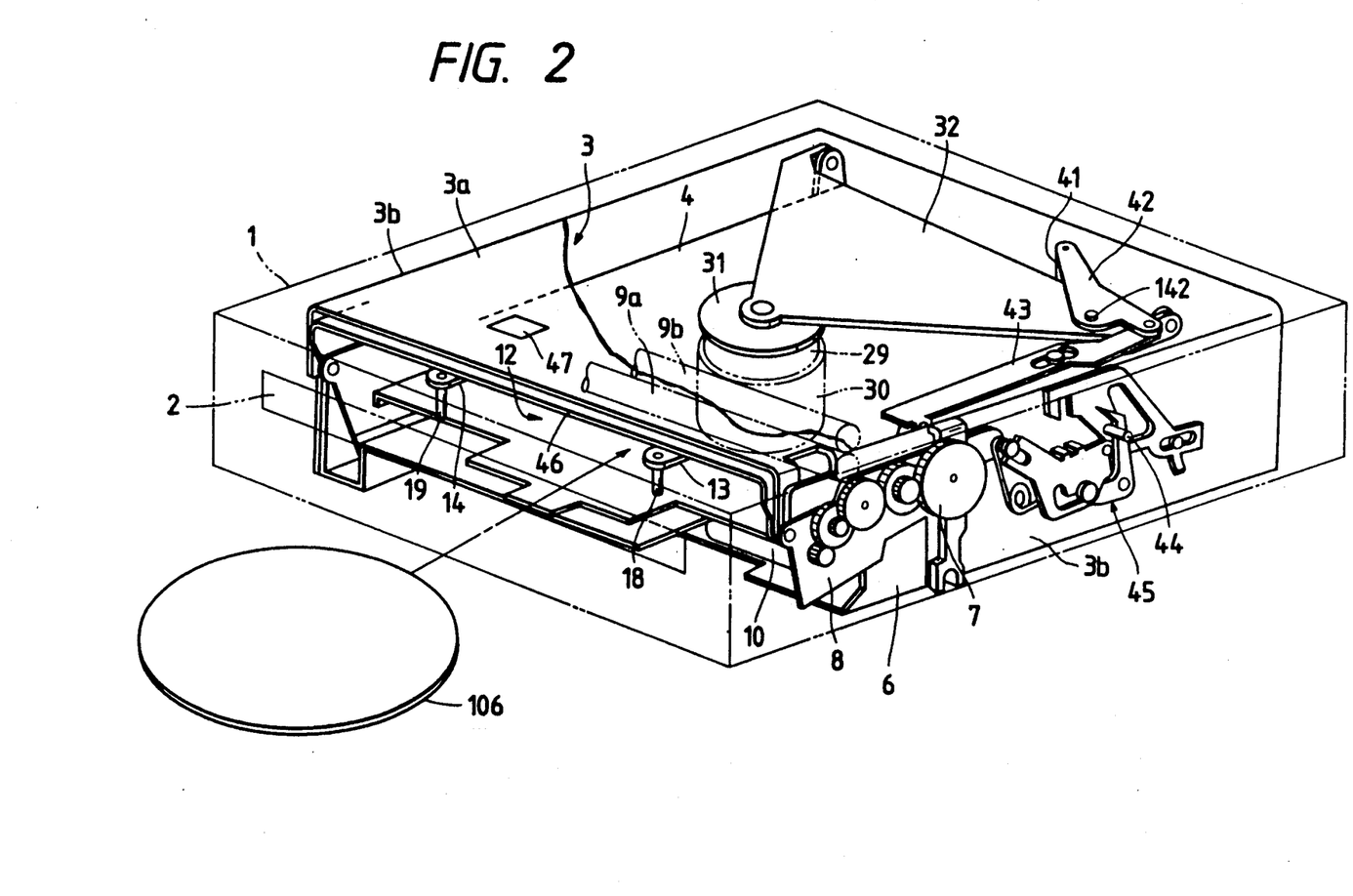
FIG. 2 is a perspective view showing one example of a vehicle CD player according to this invention.
Figure 3:
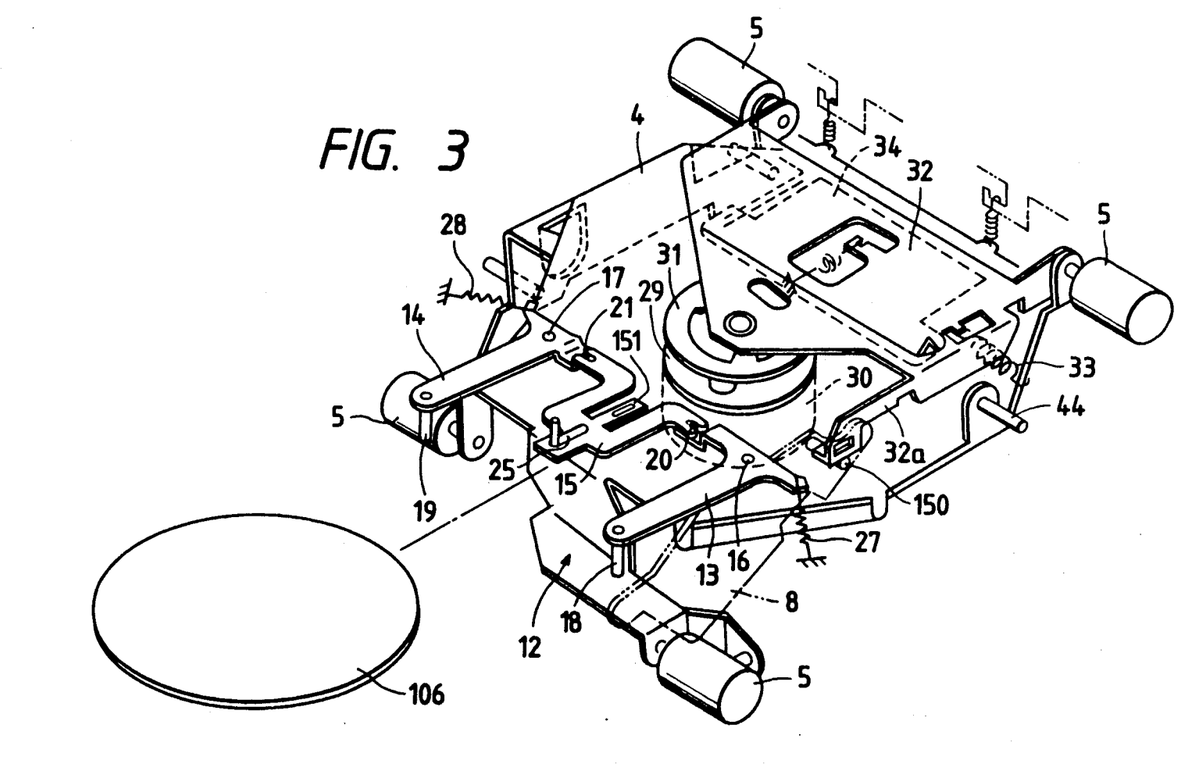
FIG. 3 is a perspective view showing a supporting frame with a centering mechanism.

In FIG. 2, reference numeral 1 designates the casing of the vehicle CD player according to the invention. A disc inserting opening 2 is formed in the front wall of the casing 1. A frame 3 is provided in the casing 1. The frame 3 is made up of a top plate 3a which is substantially in the form of a flat plate, and side plates 3b and 3b extended downwardly from both ends of the top plate 3a. A supporting frame 4 as shown in FIG. 3 is provided inside the frame 3. A reproducing means (not shown) for reproducing music recorded in discs is mounted on the supporting frame 4 substantially at the center. The supporting frame 4 is supported through dampers 5 by the frame 3 in floating manner. A loading mechanism 6 and a loading arm lowering mechanism 7, which are used to move a disc 101 inserted into the disc inserting opening 2 to a predetermined position (substantially the center of the supporting frame 4) are provided through a loading arm 8 on one side of the front end portion of the frame 3. The loading mechanism 6 has a driving roller 9a which is supported by the supporting frame 4. A loading motor 10 is provided in the frame 3 at the front end portion to rotate the driving roller 9a. The driving roller 9a thus rotated delivers the disc 106 inserted into the disc inserting opening 2 to the predetermined position in cooperation with a driven roller 9b engaged with the driving roller 9a.

Figure 4:
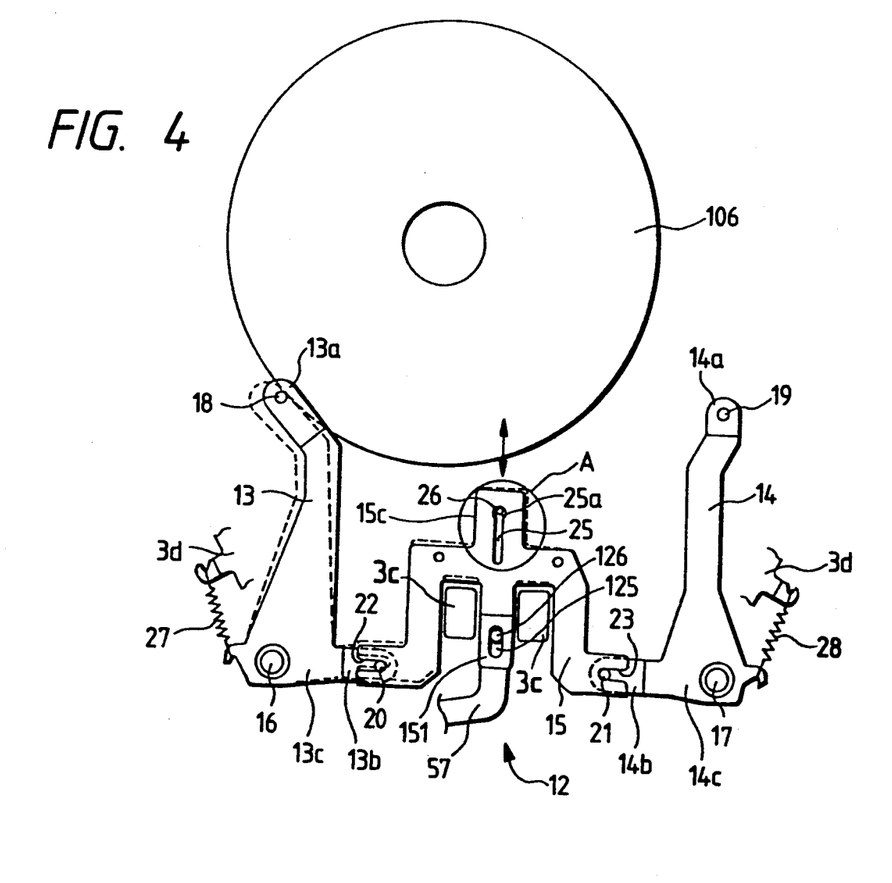
FIG. 4 is a plan view of the centering mechanism.

A centering mechanism 12 (FIG. 3) for positioning the disc 106 at the middle of the disc inserting opening 2 is provided inside the frame 3 and near the disc inserting opening 2. The centering mechanism 12, as shown in FIG. 4, comprises: a pair of centering arms 13 and 14; and a centering lever 15 interposed between with the centering arms 13 and 14.

Each of the centering arms 13 and 14 is substantially L-shaped. Each of the centering arms 13 and 14 has a tip end portion 13a, 14a to be brought into contact with the inserted CD disc 106 and a side end portion 13b, 14b. Each of the centering arms 13 and 14 is pivotally supported to the frame 3 about a support pin 16, 17 provided at a center portion 13c, 14c between the tip end portion 13a, 14a extends close to the disc inserting opening 2. Centering pins 18 and 19 are provided at the tip end portions 13a and 14a. Accordingly, it is possible to regard the centering pins 18 and 19 as the contact portions like the tip end portions 13a and 14a. The side end portions 13b and 14b have coupling pins 20 and 21 and are confronted with each other.

Figure 5:
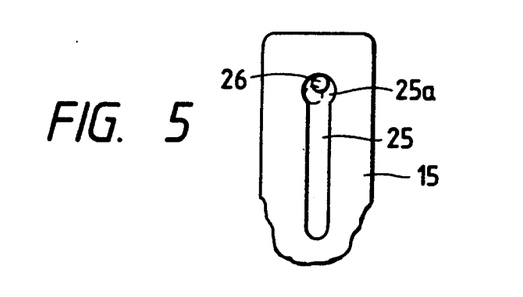
FIG. 5 is an enlarged view of the part A in FIG. 4.

The centering lever 15 is substantially inverted-W-shaped, and has coupling grooves 22 and 23 at both ends. The coupling grooves 22 and 23 are engaged with the coupling pins 20 and 21, respectively, so that the two centering arms 13 and 14 are coupled to the right and left ends of the centering lever 15. The centering lever 15 has in the middle a hole 25 which is elongated along the disc inserting direction. The elongated hole 25, as indicated at 25a in FIG. 5, is circular at the end closer to the disc inserting opening 2 (hereinafter referred to as "a circular head hole 25a"). A guide pin 26 embedded in the frame 3 is loosely fitted in the elongated hole 25 to be relatively movable within the elongated hole 25. The middle portion 15c of the centering lever 15 has an abutment 151 having a guide groove 125. The guide groove 125 is engaged with a guide pin 126 fixedly embedded in the frame top plate 3a. The middle portion 15c is disposed between a pair of guide protrusions 3c and 3d extended from the frame 3 so that it is guided by the guide protrusions 3c and 3d. Hence, the centering lever 15 is movable in the disc inserting direction.

Tension springs 27 and 28 are connected between the centering arms 13 and 14 and protrusions 3d and 3d of the frame 3, respectively, to urge the centering pins 18 and 19 to approach each other. When the disc 106 is inserted into the disc inserting opening 2, the disc is brought into contact with the centering pins 18 and 19.

It is assumed that the small diameter disc 106 is inserted into the disc inserting opening 2 in such a manner that it is shifted sidewards from the middle of the latter 2. In this case, the disc is brought into contact with one of the centering pins 18 and 19. When the disc 106 is brought into contact with the centering pin 18 as shown in FIG. 4, then the centering arm 13 is slightly turned counterclockwise about the supporting pin 16 against the elastic force of the tension spring 27. As a result, the centering lever 15 is slightly turned clockwise as a whole. As the centering lever 15 is turned in this manner, the guide pin 26 is caused to move from the center of the circular head hole 25a to abut against the lower left part (in FIG. 5) of the wall of the circular head hole 25a. Accordingly, the guide pin 26 cannot move in the elongated hole 25 relative to the centering lever; that is, the centering lever 15 cannot move towards the disc inserting opening 2. Therefore, the centering arm 13 is slightly swung by the disc 106, but it is not swung further. Thus, the disc 106 shifted sidewards is caused to position at the middle of the disc inserting opening 2, being regulated by the centering pin 18.

When the large disc 101 is positioned at the middle of the disc inserting opening 2, then it is brought into contact this case, the centering arms 13 and 14 are turned about the supporting pins 16 and 17, respectively, to move both sides of the centering lever 15 towards the disc inserting opening 12 simultaneously. In this case, the guide pin 26 is not shifted in the widthwise direction of the elongated hole 25; that is, it is movable relative to the centering lever in the elongated hole 25. Therefore, the centering lever 15 is moved towards the disc inserting hole 2. As the centering lever 15 is moved in-this manner, the centering arms 13 are further turned, so that the disc 101 can be inserted into the vehicle CD player.

As shown in FIG. 3, a turntable 29, on which a disc 106 is mounted, is provided on the supporting frame 4 substantially at the center. The turntable 29 is rotated by a spindle motor 30 provided below the supporting frame 4. A small-disc-shaped clamper 31 is arranged over the turntable 29. More specifically, the clamper 31 is coupled to the triangular end portion of a clamper arm 32 which is rockably connected to the rear end of the supporting frame 4. A tension spring 33 is connected between the clamper ar 32 and the supporting frame 4 to urge the clamper arm 32 towards the turntable 29.

Figure 6:
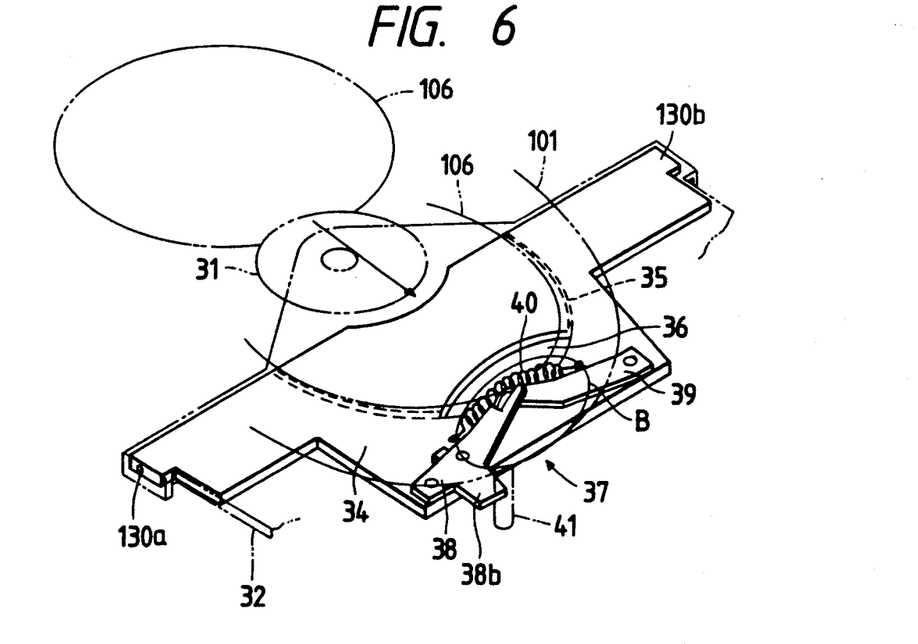
FIG. 6 is a perspective view showing an operating assist board and a depressing assist mechanism.
Figure 7:
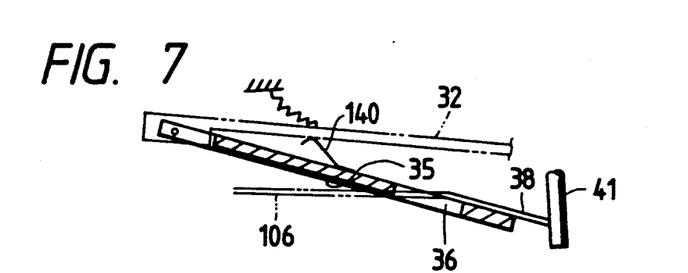
FIG. 7 is a sectional view of the operating assist board and the depressing assist mechanism.

As shown in FIGS. 6 and 7, an operating assist board 34 is provided below the clamper arm 32. When the smaller diameter 8 cm disc 106 is moved and positioned above the detecting pin 41 to mount the disc 106 on the turntable 29. The operating assist board 34 is swingably coupled to the pivot points 130a and 130b provided at both sides of the front end portion of the clamper arm 32, and is urged downwardly by a leaf spring 140. The operating assist board 34 has an arcuate disc recess 35 in the lower surface. The arcuate disc recess 35 is so shaped as to receive an 8 cm disc. Therefore, when the small diameter disc 106 is moved towards the predetermined position, it is fitted in the disc recess 35. The disc recess 35 has a hole 36 in the rear end portion in such a manner that the hole 36 is confronted with the central portion of a depressing assist mechanism 37 which is provided above the operating assist board 34. Therefore, when the disc 106 is led into the disc recess 35, its end portion abuts against the depressing assist mechanism 37 to operate the latter 37.

When the large diameter 12 cm disc 101 is moved to the turntable 29, it is not fitted into the disc recess 35 because it is larger than the latter; that is, it is moved over the disc recess 35 as it is, and it is mounted on the turntable 29 after abutting against the detecting pin 41 with its periphery.

Figure 8:
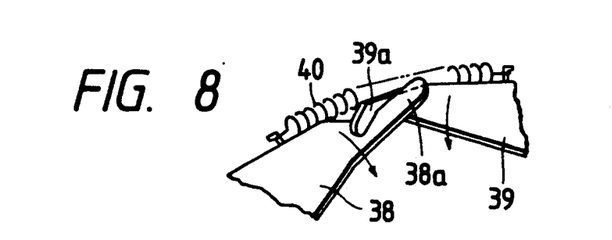
FIG. 8 is an enlarged view of the part B in FIG. 5.

The depressing assist mechanism 37 has a pair of swing arms 38 and 39. The swing arms 38 and 39 are pivotally mounted through their base portions on the operating assist board 34. A tension spring 40 is connected between the swing arms 38 and with each other as shown in FIG. 8. When being pushed through the hole 36 by the end portion of the small diameter disc 106, the end portions 38a and 39a are swung as if doors were opened. A protrusion 38b is extended from the swing arm 38 in such a manner that it is confronted with the detecting pin 41. Therefore, when the swing arm 38 is swung, the protrusion 38b depresses the detecting pin 41.

Figure 9:
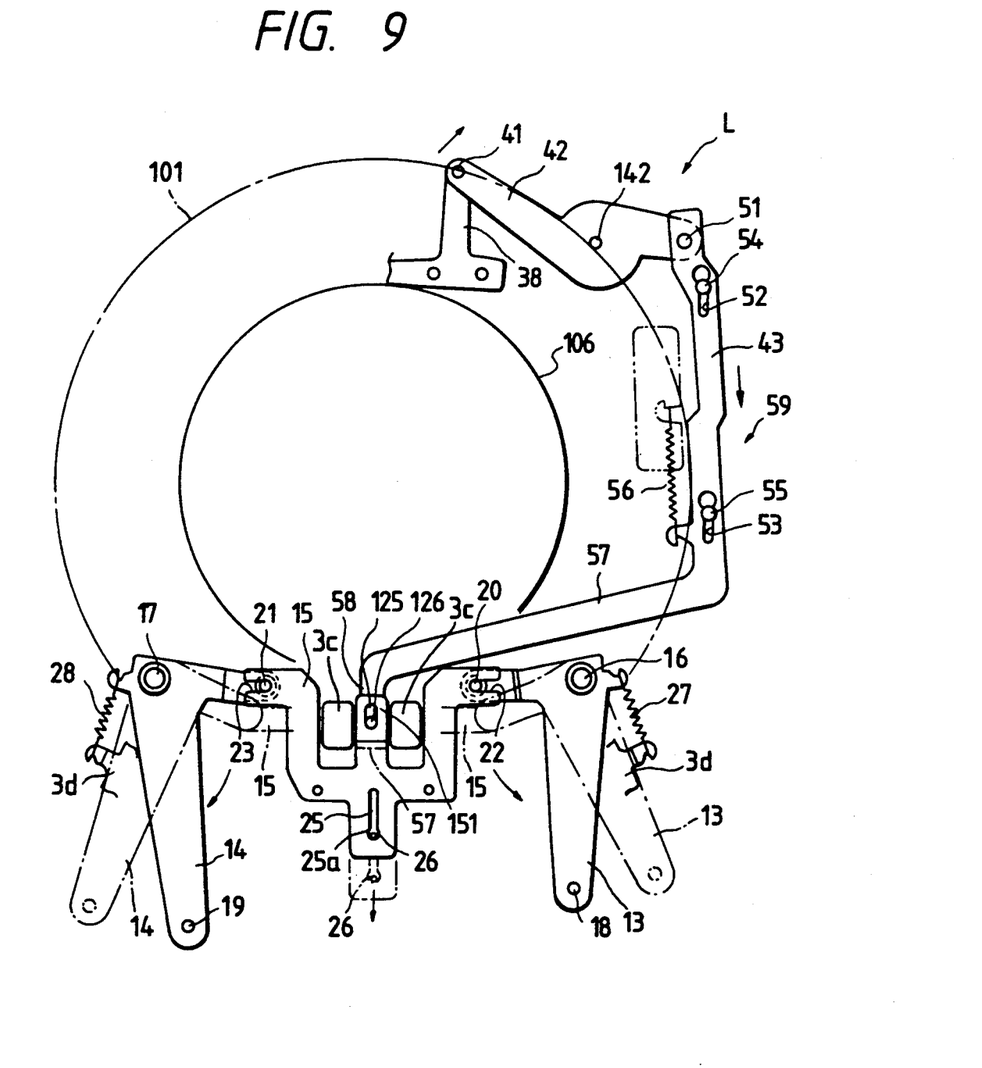
FIG. 9 is a plan view showing first and second links.

As shown in FIG. 9, the detecting pin 41 is embedded in one end portion of a first link 42 which is pivotally mounted on the rear end portion of the frame 3. The other end portion of the first link 42 is coupled through a pin 51 to one rear end portion of a second link 43 which is slidable in the disc inserting direction. These two links 42 and 43 form a link mechanism L. The second link 43 has elongated holes 52 and 53. Guide pins 54 and 55 fixed to the frame 3 are engaged with the elongated holes 52 and 53 to thereby guide the second link 43 along the top plate 3a. The second link 43 is biased rearwardly of the frame 3 by a tension spring 56. An operating lock arm 57 is provided to extend to a position in confronted relation with the abutment 151 of the centering lever 15 and has a push portion 58 for pushing the abutment 151.

When the detecting pin 41 is depressed through a swing arm 38 in the case of small diameter disc 106 or is depressed directly by the large diameter disc 101, the second link 43 is slidingly moved to release the lock state of the loading arm swing mechanism 7 and to allow the loading mechanism 7 to be lowered. At this time, the push portion 58 is moved toward the abutment 151 of the centering lever 15 together with the second link 43. When the abutment 151 is pushed by the push portion 58, the centering lever 15 is slid toward the disc inserting opening 2. Namely, the first and second links 42 and 43 are used to release the lock state of the loading arm swing mechanism 7 and to slidingly move the centering lever 15 through the push portion 58 and the like to thereby rotate the centering arms 13 and 14 to thereby separate the centering pins 18 and 19 away from the turntable 29.

On the other hand, as shown in FIGS. 2 and 3, a lock pin 44 is embedded in the side wall of the supporting frame 4 in such a manner as to extend towards the side wall of the frame 3. A locking mechanism 45 is provided on the frame 3 in such a manner that it is confronted with the lock pin 44, so that, until the disc inserted is moved to the predetermined position, the lock pin 44 is locked by the locking mechanism 45, and the supporting frame 4 is secured to the frame 3. As the loading arm 8 is moved downwardly by the loading arm operating mechanism 7, the locking mechanism 45 unlocks the lock pin 44, so that the supporting frame 4 is supported through dampers 5 in a shock absorbing mode. disc inserting opening 2, in such a manner that, when the vehicle CD player is operated, it is moved to the disc inserting opening 2 to prevent the insertion of-another disc thereinto.

Now, the operation of the vehicle disc player thus constructed will be described.

The centering mechanism 12 of the invention is effective especially in handling a small diameter disc 106. Therefore, the operation will first be described with reference to the case of a small diameter disc 106.

Upon insertion of a small diameter disc 106 into the disc inserting opening 2, a sensor 47 (FIG. 2) provided on the front end portion of the top plate 3a detects the insertion of the disc 106, to start the loading motor 10. If, in this case, the disc 106 is shifted sidewards from the middle of the disc inserting opening 2, it will abut against one of the pair of centering pins 18 and 19 of the centering mechanism 12, whereupon the disc 106 is positioned at the middle of the disc inserting opening 2 by the centering mechanism 12 in the above-described manner.

Under this condition, the driving roller 9a, being driven by the loading motor 10, cooperates with the driven roller 9b to convey the disc 106 towards the turntable 29. When the disc 106 has come near the center of the turntable, it is fitted in the disc recess 35 of the operating assist board 34 (because its diameter is 8 cm). When the disc 106 has been fitted in the disc recess 35, as shown in FIG. 7 the end portion of the disc 106 pushes the detecting pin 41 through the depressing assist mechanism 37 appearing in the hole 36. That is, the swing arm 38 is swung by the disc 106, so that its protrusion 38b pushes the detecting pin 41.

When the detecting pin 41 is pushed in this manner, as shown in FIG. 8 the first link 42 is swung about the pin 142, thereby to slide the second link 43 to activate the loading arm swing mechanism 7. As shown in FIG. 3, the clamper arm 32 has a side protrusion 32a which is limited by a pin 150 mounted on the loading arm 8. When the link mechanism L is operated, the side protrusion 32a of the clamper arm 32 is moved downwardly by the elastic force of the tension spring 33 as the pin 150 is moved downwardly together with the loading arm 8, whereby the disc 106 mounted on the turntable 29 is fixedly positioned thereon by the clamper 31. While the disc 106 is fixedly held by the clamper 31, in association with the operation of the loading arm operating mechanism 7 the locking mechanism 45 unlocks the lock pin 44, so that the supporting frame 4 is supported through the dampers 5 by the frame 3 in a shock absorbing mode; that is, it is supported in floating manner. Thus, the preliminary operation for reproduction has been accomplished. Under this condition, the spindle motor 30 is operated to rotate the disc 106 through the turntable 29. When the disc 106 is rotated in this way, the reading head (not shown) applies a laser beam to the disc. As the reading head moves radially of the disc 106, the pieces of music recorded in the disc are reproduced.

Also, when the detecting pin 41 is depressed by the disc 106 and the second link 43 is slid toward the disc inserting opening 2 (i.e., in the lower direction in FIG. 9), the abutment 151 of the centering lever is depressed by the push portion 58 of the operating arm 57 toward the disc inserting opening 2. When the abutment 151 is pushed, the centering lever 15 is slidingly moved toward the disc inserting opening 2. In accordance with this sliding movement, the centering arms 13 and 14 are rotated counterclockwise and clockwise against the spring forces of the tension springs 27 and 28, respectively. When the centering arms 13 and 14 are rotated, the centering pins 18 and 19 are held apart from the turntable 29. Thus, when the disc 106 is held at the stationary condition on the turntable 29, the centering lever 15 is moved toward the disc inserting opening 2 by the operating arm 57. Accordingly, the centering pins 18 and 19 are safely maintained at positions away from the turntable.

On the other hand, during the travel of the vehicle, the automotive CD player is provided in the front panel of the vehicle so that the CD player itself is vibrated.

Figure 10:
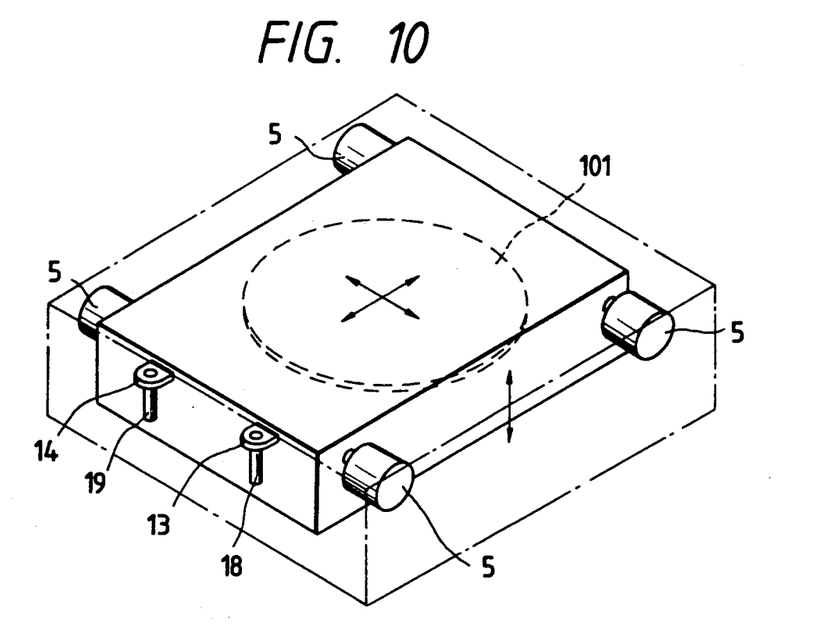
FIG. 10 is a perspective view for a description of the vibration of the supporting frame relative to a stationary frame.
Figure 11:
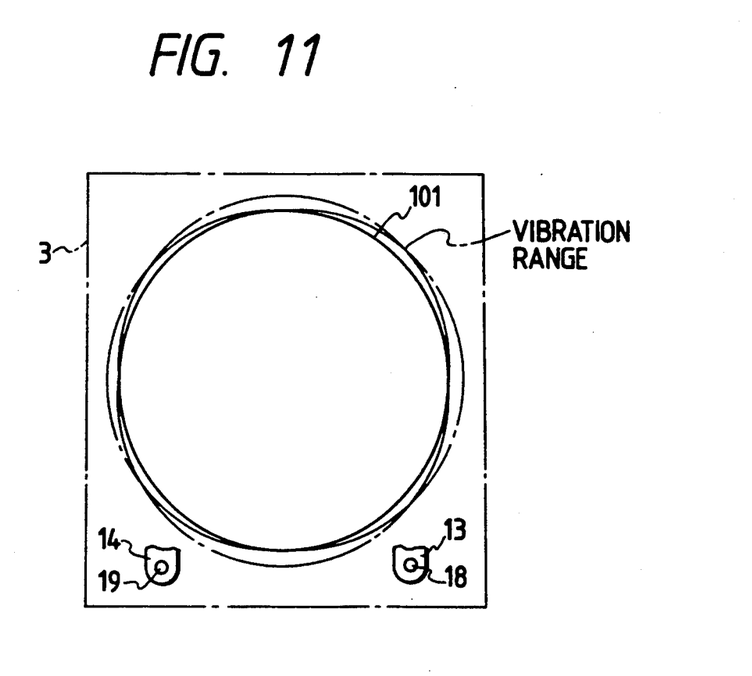
FIG. 11 is a diagram showing the range of vibration of a disc which is vibrated relative to the frame.

When the CD player is vibrated, the support frame 4 is floatingly supported to the fixed frame 3. Accordingly, as shown in FIGS. 10 and 11, the support frame 4 is vibrated in an omnidirectional manner, i.e., back and forth, right and left and up and down relative to the frame 3. Although, in case of the small disc 106 the mounting positions of the centering pins 18 and 19 are not particularly limited, in the case of the large disc 101, there is a fear that the circumferential edge of the disc 101 would collide with the centering pins 18 and 19 during the vibration of the support frame 4.

However, since the centering pins 18 and 19 are located away from the turntable 29 as described above; that is, the pins are located outside the vibration range in the back and forth and right and left directions, there is no fear that the centering pins 18 and 19 are brought into relative abutment with the disc 101 during the playback of a piece of music recorded in the disc 101.

Also, when the disc 106 or 101 is fixed to the turntable 29, as described above, the centering pins 18 and 19 are located outside the vibration range of the disc. Accordingly, even if the centering pins 18 and 19 fall within the vibration range in the reference (or initial) state of the pins, there is no problem. Therefore, there is no restriction against the design for the centering mechanism 12 due to the reference or initial arrangement of the centering pins 18 and 19. Thus, it is possible to enhance a degree of freedom when the centering pins are arranged in the frame 3.

Furthermore, since the conventional first and second links 42 and 43 are utilized for the push mechanism 59, it is unnecessary to use an independent and new member. This leads to the low cost for manufacturing.

Incidentally, a distance between the centering pins 18 and 19 may be smaller or larger than the diameter of the small disc 106. If the distance is large, the small disc may pass the space between the pins, whereas if the distance is small, the small disc may pass in abutment with the pins.

As described above, according to the present invention, since the centering mechanism for positioning the disc at the center of the disc inserting opening with the centering arm eds, even if the disc is inserted to be displaced in one direction of the disc inserting opening the disc may be restricted by the centering arm ends to be located at the center of the disc inserting opening.

Also, the contact portions of the centering arms of the centering mechanism with the circumferential edge of the disc are located outside the vibration range when the disc is floatingly supported. For this reason, even if the disc fixed to the turntable is relatively vibrated to the contact portions of the turntable, there is no fear that the contact portions would be brought into direct contact with the disc.

Also, when the disc is not located on the turntable, it is possible to locate the contact portions of the centering arms outside the vibration range of the disc. Accordingly, there is no limit for design of the centering mechanism due to the provision of the contact portions of the centering arms. Thus, a design freedom is increased when the centering mechanism is thus arranged.

We claim:

1. A disc player comprising:
    a casing having a disc inserting opening;
    a turntable driven by a spindle motor;
    a clamper arm operating means for operating a clamper arm in cooperation with said turntable;
    a centering means for guiding a disc from said disc inserting opening onto said turntable, said centering means including a pair of centering arms each having at distal end portions contact portions which are to be brought into contact with a circumferential edge of the disc, said centering arms being pivotally movable at a predetermined distance in the disc inserting opening;
    detecting means including a detecting pin for detecting a condition that the disc is laid on at a predetermined position within said casing;
    means for separating said pair of centering arms away from the circumferential edge of the disc when the disc is loaded on said turntable in cooperation with said clamper arm operating means, said separating means being in cooperation with said centering means whereby the disc is located outside of a vibration range of the disc; and a centering lever means interposed between said centering arms, wherein said separating means includes a linkage means, said detecting pin being disposed on said linkage means, said linkage means including a push portion for engaging with said centering lever means.

2. The disc player according to claim 1, wherein said centering lever means allows said pair of centering arms to be pivotally opened when the circumferential edge of the disc is simultaneously brought into contact with said contact portions of said centering arms and locks said pair of centering arms when the circumferential edge of the disc is brought into contact with only one of said contact portions of said centering arms.

3. The disc player according to claim 1, wherein said linkage means has a first link and a second link, said first link is pivotally coupled to said detecting means and said second link has said push portion for engaging with said centering lever means.

4. The disc player according to claim 3, wherein said centering lever means includes an abutment that is engaged with said push portion of said second link of said linkage means.

* * * * *